(12) United States Patent
Vollmer et al.

(10) Patent No.: US 7,565,420 B2
(45) Date of Patent: Jul. 21, 2009

(54) METHOD FOR INITIALIZING A DISTRIBUTED SOFTWARE ARCHITECTURE AND AN ELECTRONIC SYSTEM

(75) Inventors: Vasco Vollmer, Holl (DE); Matthias Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 10/481,666

(22) PCT Filed: Mar. 15, 2002

(86) PCT No.: PCT/DE02/00930

§ 371 (c)(1),
(2), (4) Date: Jan. 5, 2005

(87) PCT Pub. No.: WO02/103516

PCT Pub. Date: Dec. 27, 2002

(65) Prior Publication Data

US 2006/0089963 A1    Apr. 27, 2006

(30) Foreign Application Priority Data

Jun. 19, 2001   (DE)   ................... 101 29 446

(51) Int. Cl.
G06F 15/173 (2006.01)
G06F 15/16 (2006.01)
G06F 13/00 (2006.01)

(52) U.S. Cl. .................. 709/223; 709/225; 709/208; 710/107; 710/110

(58) Field of Classification Search .............. 709/201, 709/202, 203, 220–222, 223, 225, 208; 710/107, 710/110
See application file for complete search history.

(56) References Cited

U.S. PATENT DOCUMENTS

| | | | | |
|---|---|---|---|---|
| 5,892,925 A | * | 4/1999 | Aditya et al. | 709/230 |
| 6,023,232 A | * | 2/2000 | Eitzenberger | 340/988 |
| 6,085,236 A | * | 7/2000 | Lea | 709/220 |
| 6,236,395 B1 | * | 5/2001 | Sezan et al. | 715/723 |
| 6,237,143 B1 | * | 5/2001 | Fontana et al. | 717/127 |
| 6,430,164 B1 | * | 8/2002 | Jones et al. | 370/313 |
| 6,526,460 B1 | * | 2/2003 | Dauner et al. | 710/65 |

(Continued)

FOREIGN PATENT DOCUMENTS

JP    10-157535    6/1998

(Continued)

OTHER PUBLICATIONS

"The HAVi Specification, Specification of the Home Audio/Video Interoperability (HAVi) Architecture," HAVi Specification 1.0, HAVi Organization, Jan. 18, 2000.

(Continued)

*Primary Examiner*—Kevin Bates
(74) *Attorney, Agent, or Firm*—Kenyon & Kenyon LLP (57) ABSTRACT

The present invention relates to a method for initializing a distributed software architecture as well as an electronic system. A control module for a network function is made available in the form of a DCM. This control module is registered in a registry as a DCM. The present invention permits extending a distributed software architecture, e.g., in accordance with the HAVi standards, by network and system administration functions, which, in particular, permit the application to motor vehicles.

18 Claims, 6 Drawing Sheets

U.S. PATENT DOCUMENTS

| | | | | |
|---|---|---|---|---|
| 6,563,430 | B1 * | 5/2003 | Kemink et al. | 340/825.49 |
| 6,694,349 | B1 * | 2/2004 | Zou | 709/202 |
| 6,694,363 | B1 * | 2/2004 | Yamadaji et al. | 709/223 |
| 6,854,121 | B2 * | 2/2005 | Barnard et al. | 719/315 |
| 6,963,784 | B1 * | 11/2005 | Gibbs | 700/94 |
| 7,042,894 | B2 * | 5/2006 | Nakamura | 370/426 |
| 7,111,079 | B2 * | 9/2006 | Cheng | 709/249 |
| 7,412,538 | B1 * | 8/2008 | Eytchison et al. | 709/227 |
| 2001/0018718 | A1 * | 8/2001 | Ludtke et al. | 709/321 |

FOREIGN PATENT DOCUMENTS

| | | |
|---|---|---|
| WO | WO 01/19032 | 3/2001 |

OTHER PUBLICATIONS

"HAVi, The A/V Digital Network Revolution," HAVi Organization, 1999 (http://www.HAVi.org).

The HAVi Specification: Specification of the Home Audio/Video Interoperability (HAVi) Architecture Nov. 19, 1998, pp. 1-384, XP002116332.

"The HAVi Specification" Mar. 15, 2001, Online, Havi Inc. XP002265178, Gefunden im Internet:<URL:http://www.havi.org/technifo/download.html>.

Rashid A., et al., "A Flexible Approach for Instance Adaption during Class Versioning", 2000, pp.101-113, Springer-Verlag Lectures on Computer Science.

Ibenthal A., et al. "Multimedia in Motor Vehicles" Sep. 1999, pp. 43-52, ITG-Fachbericht Nr. 156, Deutschland.

International Search Report.

* cited by examiner

METHOD FOR INITIALIZING A DISTRIBUTED SOFTWARE ARCHITECTURE AND AN ELECTRONIC SYSTEM

FIELD OF THE INVENTION

The present invention relates to a method for initializing a distributed software architecture, e.g., for a bus system for motor vehicles, and a corresponding electronic system.

BACKGROUND OF THE INVENTION

Various distributed software architectures are known prior art, e.g., "The HAVi Specification, Specification of the Home Audio/Video Interoperability (HAVi) Architecture", HAVi Specification 1.0, HAVi Organization, Jan. 18, 2000, discloses a distributed software architecture for implementing in so-called consumer electronics (CE) units and computers, such as, for example, so-called personal digital assistants and other electronic units which have a computer. The HAVi includes services which simplify the interoperability and the development of distributed applications in in-house networks. One example application of the HAVi architecture relates to CE units which are in accordance with IEEE 1394 and/or IEC 61883 interface standards.

In the distributed software architecture according to the HAVi industry standard, control of the individual units takes place via control modules, so-called device control modules (DCM). In the case of a DCM, an HAVi software element is involved, which makes available an interface for controlling the unctions of a particular unit. Thus, each DCM is specific to a particular device or a particular device class.

Figure 1:
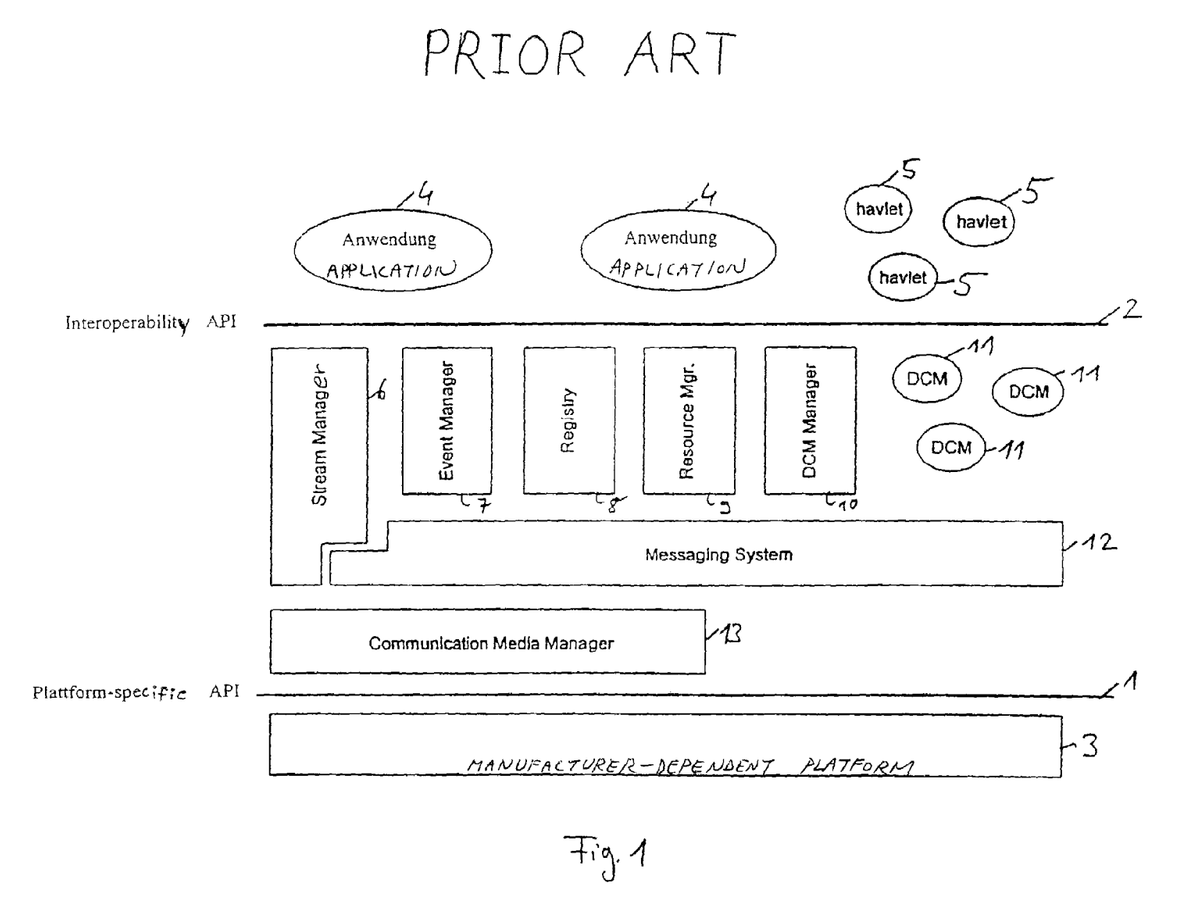
FIG. 1 is a block diagram illustrating the HAVi software architecture known in the art.

FIG. 1 shows an example of HAVi software elements which form an intervening layer between platform-specific application programming interfaces (API) and platform-independent applications. The example of FIG. 1 is disclosed in, e.g., "HAVi, The A/V Digital Network Revolution", HAVi Organization, 1999 (http://www.HAVi.org).

The distributed software architecture is implemented between a platform-specific API 1 and an interoperability-API 2. Below platform-specific API 1, there is a manufacturer-dependent platform 3; above interoperability API 2 are applications 4, as well as so-called "havlets" 5. In the case of a havlet, a HAVi Java application is involved which is loaded by a DCM or an application module, upon the query of a control unit.

The actual HAVi components can be addressed as software elements, as individual modules in the system. In this context, the software elements may in general be positioned centrally, as well as in distributed fashion, i.e., an implementation having only one entity of a certain software element, as well as an implementation which provides for such an entity in each unit, are possible. Going into details, the system contains the following software elements:

Stream manager 6 is used to set up, disconnect and manage links between software elements or devices. The stream manager may, just as may a registry, be set up as a distributed system. In this context, special commands can be used to query the state of all the stream managers or a particular stream manager.

Event manager 7 transports messages regarding state changes in the system to the communications participants.

Registry 8 contains information on each software element available in the network and each available device. In this context, data on the individual software elements is stored in attributes. In addition to the predefined attributes, it is possible to add further ones. The architecture of the registry permits a distribution in the system, i.e. each device may include a part of the entire registry, but it may also be supported centrally. This is invisible for access to the registry, since, if the occasion arises, the various entities of the registry independently exchange the required information inside the network.

Resource Manager 9 carries out the occupation and release of resources—i.e. units and software elements—and stores planned procedures, such as video recorder takes.

DCM Manager 10 is responsible for the instalment and deinstalment of DCMs in appropriately suitable devices. In this context, a standardized method for installing DCMs in Java-byte code format is available. An installation of native code (binary) is not described in the HAVi standard, but may be added as a proprietary solution.

Device Control Module (DCM) 11 is a software element which brings together one or more functional control modules (FCM) to a device driver.

Functional Control Module (FCM) is a software element by which a functional unit of a device, (e.g. a CD drive or a UKW tuner) is controlled. In this context, a DCM is formed from the basic functions and device-specific FCMs that are common to all DCMs.

These distributed modules, or, in a certain device, implemented modules, form a uniform interoperability API 2. By this uniform interface, an interoperability is achieved between applications 4 and the devices of various manufacturers.

The HAVi software architecture also includes a messaging system 12, which is used for the exchange of messages between the various HAVi software elements. Communications media manager 13 permits other devices or software elements to execute asynchronous or isochronous communications via the network. For example, communications media manager 13 runs according to the IEEE 1394 standard.

SUMMARY OF THE INVENTION

The present invention provides an improved method for the initialization of a distributed software architecture and an improved electronic system having a distributed software architecture, as well as a corresponding computer program product, e.g., for use in vehicles. The computer program product may include a computer-readable storage medium storing a computer program that, when executed on a computer, implements the above-mentioned method.

The present inventions permits seamlessly integrating additional management functions and control functions for networks, e.g., for use in vehicles, into a distributed system, e.g., a system according to the HAVi standard. In this context, the corresponding network functions are made available as control modules in the form of DCMs in one or several of the network participants.

In this context, the control modules for network functions have only the form of a DCM, but they differ substantially from the functionality of a DCM known in the prior art, inasmuch as network functions, e.g., management functions and control functions, such as in an automobile network, and not only device-specific functions, are controlled by a control module according to the present invention. In this connection, it is of advantage that the registration of the control module in a registry may take place as a DCM.

According to one example embodiment of the present invention, a control module is made up of functional modules for network functions, each of the functional modules having the form of an FCM. In contrast to the FCMs known in the prior art, the functional modules that are only implemented in the form of FCMs, according to the present invention, are used not only for device-specific functions but also for network functions.

In this context, what may be involved, among other things, are functions such as the management of current-saving modes in the network, the carrying out of error recognition mechanisms and error removal mechanisms, the carrying out of authentication and the control of an access control in the network, the execution of a broadened connection management for administering the transmission capacity and the administration of data encoding in the case of transmission of data between devices in the network.

These network functions are advantageous for use in vehicles. In this context, in conformance with the methods described in the HAVi standard for adding specific device drivers (DCMs), additional network functions and systems administration functions may be added with the aid of one of the HAVi methods, if these additional function modules have the form of DCMs.

In this context, a control module according to the present invention, depending on the development of its functional modules, plays the role of a system master or a system slave, which is also designated as system manager. In the first case of a system master DCM, the network function relates to the central control of network elements; in the second case the functional modules include functions for the local control of a device as "slave", that are adjusted to the corresponding functions of the system master DCM.

According to one example embodiment of the present invention, a control module includes additional communications functions, so as to interact with other control modules. These communications functions are used, for example, for the diagnosis of the system master DCM or the replacement of a system master DCM by another system master DCM or parts thereof.

DETAILED DESCRIPTION

Figure 2:
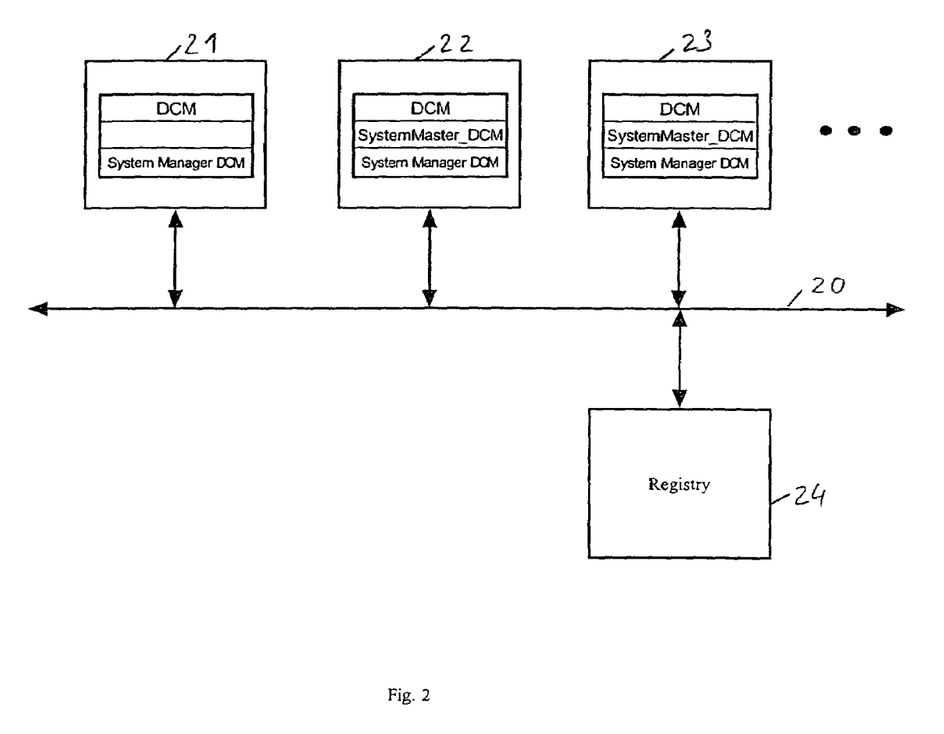
FIG. 2 illustrates an exemplary embodiment of an electronic system according to the present invention.

FIG. 2 shows an electronic system having a bus 20 which links network users 21, 22, 23 and 24 to one another, as well as additional network users not shown in FIG. 2. Different devices may be involved in the network users. For applications with respect to multimedia, information and entertainment services in connection with Internet services, for example, CD players, MP3 players, DVD players, UMTS and/or GSM modules for data transmission, Internet browsers, display units, such as, for example, so-called flat panel displays, input devices, user surfaces and the like may be involved.

Network user 21 contains a DCM for the implementation of device-specific driver software. The network user also has a system manager DCM, but no system master DCM.

By contrast, network users 22 and 23 each additionally contain a system master DCM according to the present invention. In this context, the system master DCMs in network users 22 and 23 may be different from one another, such as having different versions and/or different functionalities.

Network user 24 contains the registry for registering the various devices and software elements. Alternatively, the registry may also be implemented in a distributed manner in the network users.

Figure 3:
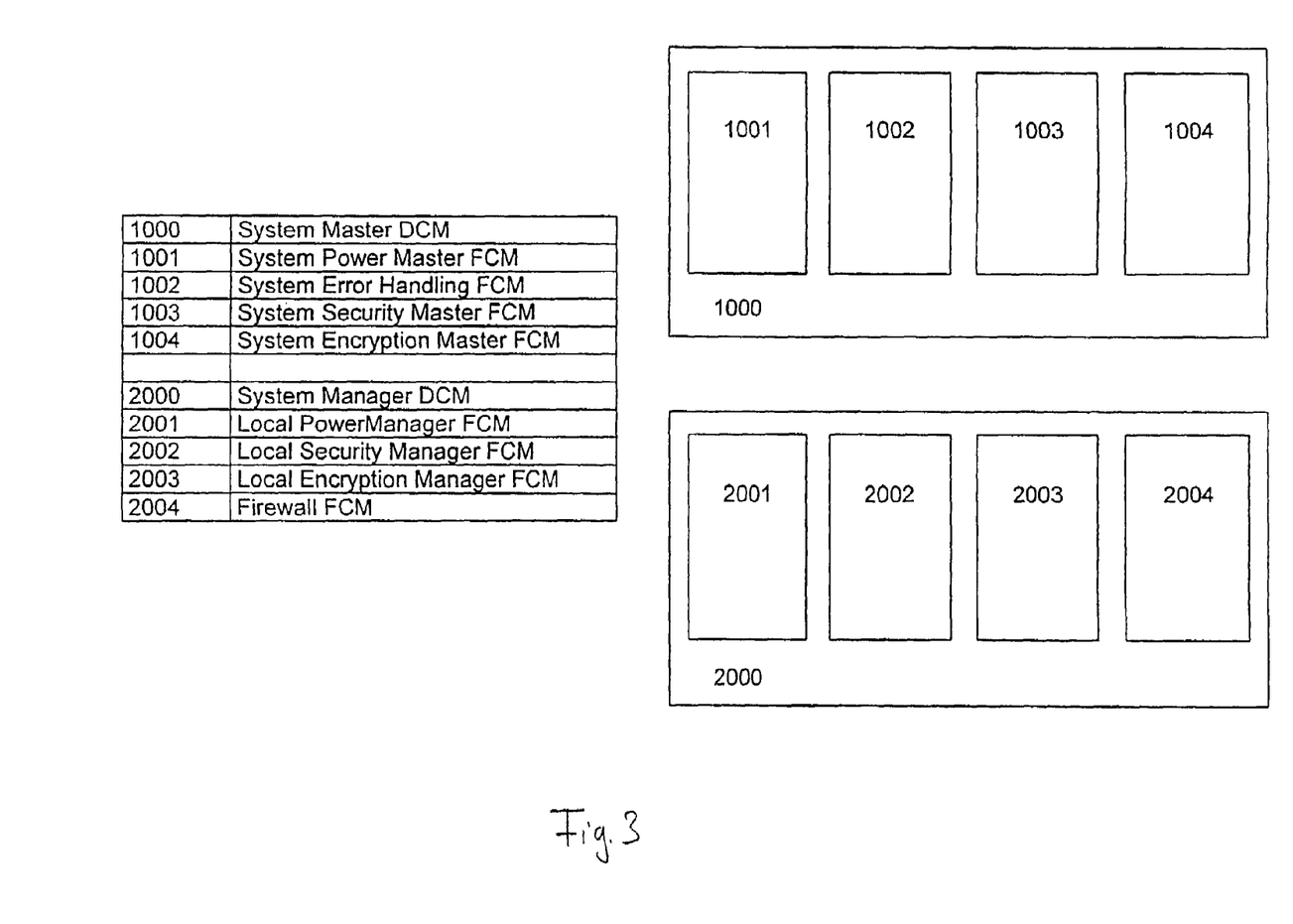
FIG. 3 illustrates an exemplary embodiment for the structure of a system master DCM and a system Manager DCM.

FIG. 3 shows the structure of a system master DCM 1000. This contains a functional module 1001 for administering current saving modes in the network ("system power master FCM"). In addition, system master DCM 1000 contains a functional module 1002 for carrying out error detection mechanisms and error removal mechanisms ("system error handling FCM").

In addition, system master DCM 1000 contains a functional module 1003 for the authentication and control of an access control in the network ("system security master FCM"). Furthermore, system master DCM 1000 contains a functional module 1004 for administering the data encryption during transmission of data between units in the network ("system encryption master FCM").

FIG. 3 also shows the structure of system manager DCM 2000, which interacts with system master DCM 1000 as "slave". Corresponding to functional modules 1001 to 1004 of system master DCM 1000, system manager DCM 2000 contains functional modules 2001 "local power manager FCM", 2002 "local security manager FCM", 2003 "local encryption manager FCM" and 2004 "firewall FCM", in each case for the local implementation of the corresponding functions specified by system master DCM.

Figure 4:
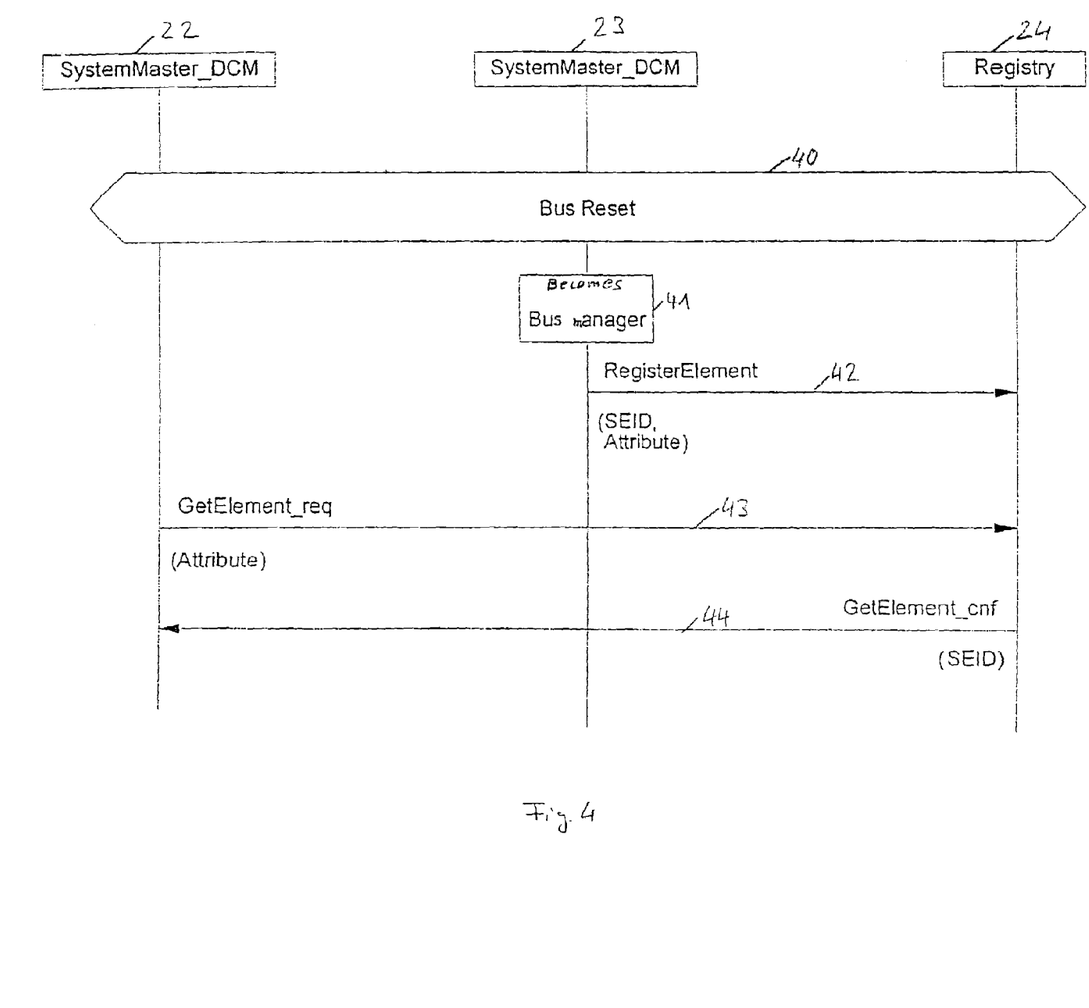
FIG. 4 is an object-interaction diagram illustrating the registration of a system master DCM.

FIG. 4 shows an object-interaction diagram, the objects shown in FIG. 4, to which elements of FIG. 2 correspond, being denoted by the reference numerals of FIG. 2.

In step 40, first of all, a so-called bus reset is carried out. The network users which are connected to one another by bus 20 (cf. FIG. 2), after the bus reset, may try to become bus managers. In this context, a method according to an established IEEE standard may be used.

In the exemplary embodiment of FIG. 4, network user 23 becomes a bus manager in step 41. Thereupon, the bus manager, in step 42, registers its system master DCM in registry 24, using the command "register element". In this context, software element ID (SEID) as well as attributes of system masters DCM of network user 23 are transmitted to registry 24 as arguments, so as to be entered into the registration there.

In step 43, network user 22, which did not become bus manager, accesses registry 24, to query it as to whether a system master DCM has been registered there. This is done using the command "get-element req", a search word for the system master DCM being used as an attribute.

This query is answered by registry 24 to the effect that a message "GetElement-cnf" will be transmitted back to network user 22, which has as argument the SEID of the previously registered system master DCM of network user 23. Based on this answer of the query of step 43 in step 44, network user 22 receives the information that one system master DCM has already been registered, as well as the SEID of registered system master DCM. Because of that, network user 22 is put in the position of addressing registered system master DCM using its SEID.

Figure 5:
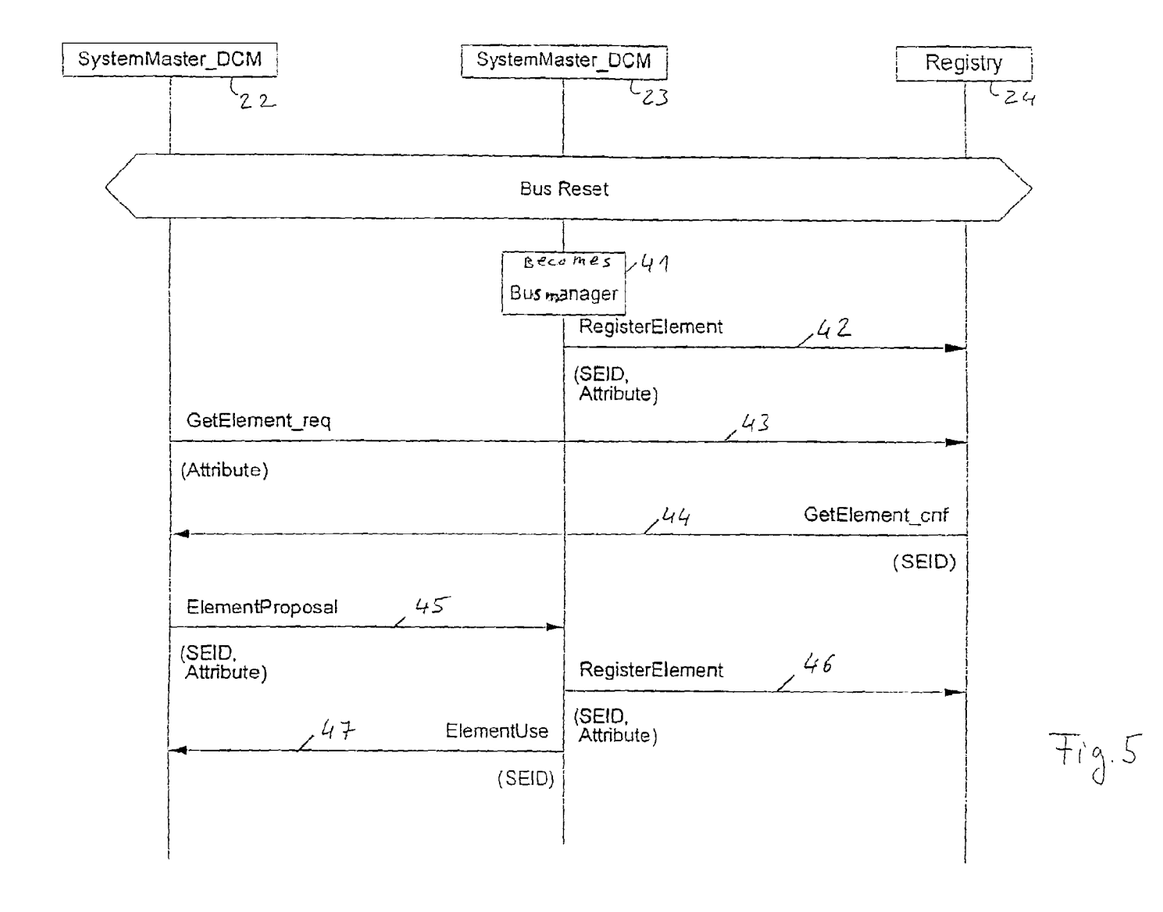
FIG. 5 is an object-interaction diagram illustrating the partial substitution of a registered system master DCM by another system master DCM or parts thereof.

The object-interaction diagram of FIG. 5 corresponds to the exemplary embodiment of FIG. 4, however, after the execution of step 44, additional steps being carried out. In this context, additional communications functions implemented in system master DCM have the following effects.

In step 45, network user 22, i.e. its system master DCM, directs a message to system master DCM of network user 23. This message "ElementProposal" includes the SEID and the attributes of system master DCM of network user 22. Network user 23 or its system master DCM can then undertake an appropriate comparison of the two system master DCMs, such as with regard to their versions and the functional modules contained.

If, for example, system master DCM of network user 22 has a new version number, it can be decided that the system master DCM of network user 22 should go to the place of the previously registered system master DCM of network user 23.

Alternatively, only certain functional modules in the system master DCM of network user 22 may be selected, in order to supplement the previously registered system master of network user 23 appropriately or to exchange a certain functional module in the already registered system master DCM.

After the decision of network user 23 or its system master DCM with respect to the registration of the system master DCM of network user 22 or parts thereof,—if an exchange is to come about—in step 46 a message is sent to registry 24 which contains the SEID of the system master DCM of network user 22 and the SEIDs of the functional modules to be supplemented or exchanged, as well as the corresponding attributes, as arguments. On account of this, the registering of the new system master DCM of network user 22 or its functional modules takes place.

In step 47 a confirmation takes place by system master DCM of network user 23 to the system master DCM of network user 22 with regard to the registration. In this context, as argument, the SEID of the newly registered system master DCM of network user 22 or the SEIDs of the selected functional modules of the system master DCM of network user 22 are transmitted back. On account of that, the system master DCM of network user 22 can address the corresponding software elements of the valid system master DCM, as they are recorded in registry 24.

Figure 6:
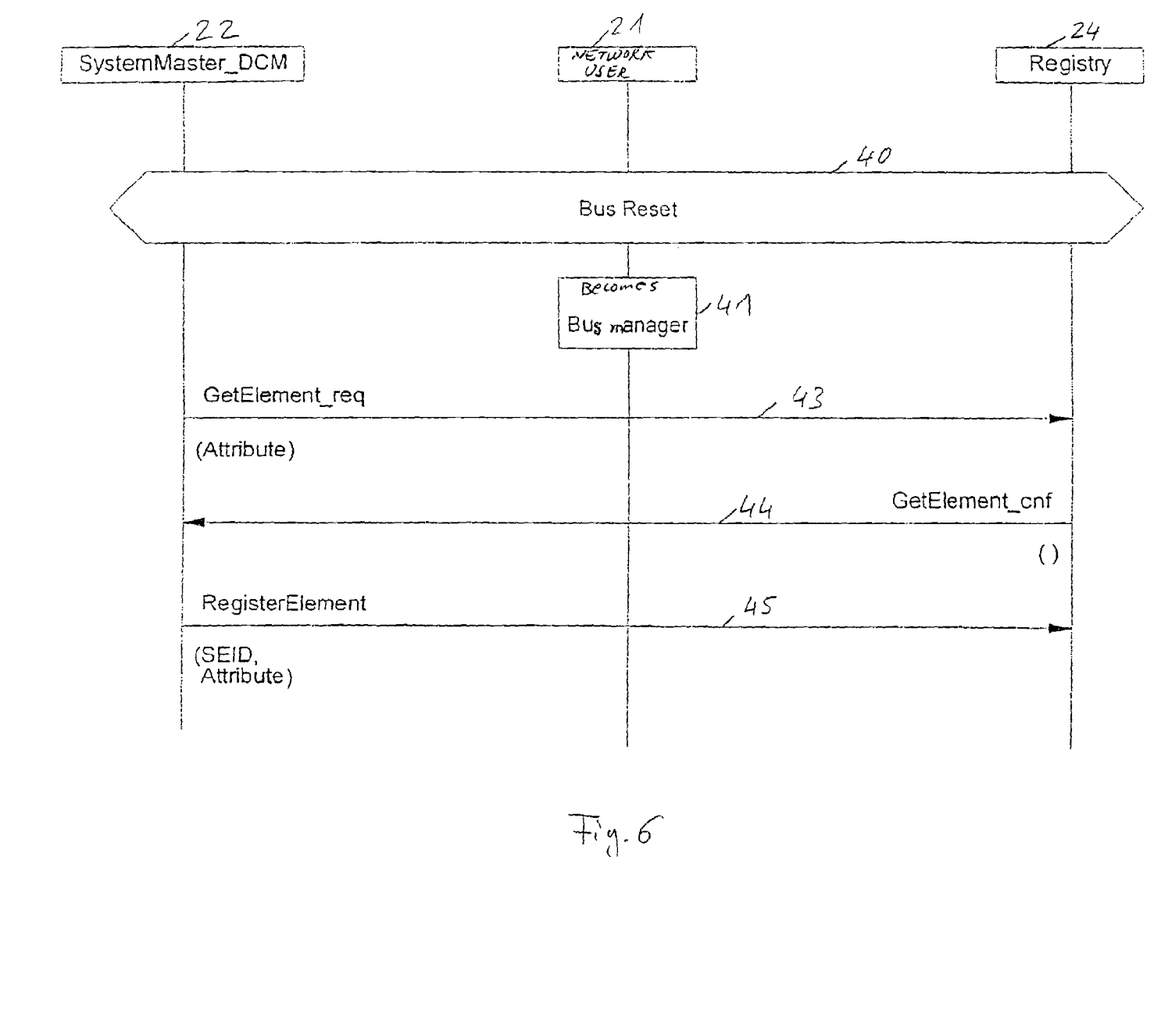
FIG. 6 is an object-interaction diagram for registering a system master DCM when the bus manager has no system master DCM.

FIG. 6 shows an additional exemplary embodiment of an object-interaction diagram corresponding to FIGS. 4 and 5. In this context, network users 21, 22 and 24 (cf. FIG. 2) are shown as the objects. Those steps in FIG. 6, which correspond to steps in FIGS. 4 and 5, are denoted by the same reference numerals.

By contrast to the exemplary embodiments of FIGS. 4 and 5, in the exemplary embodiment of FIG. 6, a network user becomes bus manager—network user 21—, which does not contain any system master DCMs. In that case, the bus manager cannot register any system master DCM in registry 24 (cf. step 42 in FIGS. 4 and 5). Therefore, no SEID can be transmitted as argument of the message in step 44, upon the query of the system master DCM of network user 22.

Thereby the system master DCM of network user 22 is signaled that, up to this point, no system master DCM has been registered in registry 24. Therefore, in step 45 a message is sent by the system master DCM of network user 22 to registry 24, which is used to register the system master DCM of network user 22 in registry 24. This message "RegisterElement" includes as arguments the SEID of the system master DCM of network user 22 as well as its attributes. Upon receipt of this message, an appropriate registration takes place in the registry.

What is claimed is:

1. A method for initializing a distributed software architecture, comprising:
   providing a first software control module for a network function, the control module being in the form of a device control module (DCM); and
   registering the control module in a registry as a DCM;
   wherein the control module includes a plurality of functional modules each having the form of a functional control module (FCM); and
   wherein the functional modules perform the following network administration functions:
   administration of current-saving modes in the network;
   performing one of error recognition and error removal;
   one of authenticating and controlling an access control in the network;
   performing an extended connection management for administering a transmitting capacity; and
   administering data encryption in the transmission of data between devices in the network.

2. The method as recited in claim 1, wherein the functional modules perform network functions specific to motor vehicles.

3. The method as recited in claim 1, wherein the first control module is made available by a first network user, the method further comprising:
   making available a second control module by a second network user; and
   selecting between the first and the second control modules;
   wherein a number of network users is greater than two, and at least one of the network users does not have a control module.

4. The method as recited in claim 3, further comprising:
   selecting one of the network users as a bus manager; and
   if the selected bus manager includes a control module, registering the control module of the selected bus manager in the registry.

5. The method as recited in claim 4, wherein only a network user that includes a control module is selected as the bus manager.

6. The method as recited in claim 4, further comprising:
   querying the registry by at least one of the network users that have a control module, whether any control module is already registered in the registry; and
   if a control module is registered in the registry, transmitting a software element identifier of the registered control module to the network user that initiated the query.

7. The method as recited in claim 4, further comprising:
   querying the registry by at least one of the network users that have a control module, whether any control module is registered in the registry; and
   if no control module is registered in the registry, registering a control module of a network user that is not the bus manager.

8. The method as recited in claim 3, further comprising:
   sending data regarding a property of a control module of a network user that is not registered in the registry, to a network user whose control module is registered in the registry; and
   selecting, by the network user whose control module is registered in the registry, at least one component of the control module of the network user that is not registered in the registry.

9. The method as recited in claim 8, further comprising:
   if the network user whose control module is registered in the registry has made a selection of the at least one component of the control module of the network user that is not registered in the registry, registering the selected at least one component of the control module in the registry; and sending a software element identifier of the selected at least one component of the control module.

10. The method as recited in claim 1, the method further comprising:

making available a second control module by a second network user;

selecting between the first and the second control modules;

selecting one of the network users as a bus manager, and if the selected bus manager includes a control module, registering the control module of the selected bus manager in the registry, wherein only a network user that includes a control module is selected as the bus manager;

sending data regarding a property of a control module of a network user that is not registered in the registry, to a network user whose control module is registered in the registry, and selecting, by the network user whose control module is registered in the registry, at least one component of the control module of the network user that is not registered in the registry; and registering the selected at least one component of the control module in the registry if the network user whose control module is registered in the registry has made a selection of the at least one component of the control module of the network user that is not registered in the registry, and sending a software element identifier of the selected at least one component of the control module;

wherein a number of network users is greater than two, wherein at least one of the network users does not have a control module, wherein the functional modules perform network functions specific to motor vehicles, and wherein the first control module is made available by a first network user.

11. The method as recited in claim 10, further comprising:

querying the registry by at least one of the network users that have a control module, whether any control module is already registered in the registry; and if a control module is registered in the registry, transmitting a software element identifier of the registered control module to the network user that initiated the query.

12. The method as recited in claim 10, further comprising:

querying the registry by at least one of the network users that have a control module, whether any control module is registered in the registry; and if no control module is registered in the registry, registering a control module of a network user that is not the bus manager.

13. A computer-readable storage medium storing a computer program that, when executed on a computer, carries out a method comprising:

making available a first control module for a network function by a first network user, the first control module being in the form of a device control module (DCM), wherein the control module includes a plurality of functional modules each having the form of a functional control module (FCM); and wherein the functional modules perform the following network administration functions: administration of current-saving modes in the network; performing one of error recognition and error removal; one of authenticating and controlling an access control in the network; performing an extended connection management for administering a transmitting capacity; and administering data encryption in the transmission of data between devices in the network;

making available a second control module for a network function by a second network user, the second control module being in the form for a DCM, wherein a number of network users is greater than two, and at least one of the network users does not have a control module;

selecting one of the network users as a bus manager; and if the selected bus manager includes a control module, registering the control module of the selected bus manager in the registry.

14. An electronic system, comprising:

at least one network user element that has a control module for a network function, the control module being in the form of a device control module (DCM); and a network user element including a registry for registering the control module as a DCM;

wherein the control module includes a plurality of functional modules each having the form of a functional control module (FCM); and wherein the functional modules perform the following network administration functions: administration of current-saving modes in the network; performing one of error recognition and error removal; one of authenticating and controlling an access control in the network; performing an extended connection management for administering a transmitting capacity; and administering data encryption in the transmission of data between devices in the network.

15. The electronic system as recited in claim 14, further comprising:

a bus system for network functions of a motor vehicle.

16. The electronic system as recited in claim 14, wherein a first network user having a first control module and a second network user having a second control module are provided, the first and the second control module each having communications functions for selection of at least a portion of one of the control modules for registration in the registry.

17. The electronic system as recited in claim 16, wherein the first control module functions as a master control module, and wherein the second control module functions as a slave control module that interacts with the master control module.

18. The electronic system as recited in claim 17, wherein the slave control module includes functional control modules (FCM) for local functions.

* * * * *